May 7, 1968 S. N. EINHORN ETAL 3,382,373

EXCITATION SYSTEM FOR PARAMETRIC DEVICES

Filed May 7, 1964

INVENTORS.
SIDNEY N. EINHORN
WILMER S. POWELL

BY Francis A. Varallo
AGENT

United States Patent Office 3,382,373

Patented May 7, 1968

3,382,373

EXCITATION SYSTEM FOR PARAMETRIC DEVICES

Sidney N. Einhorn, Willow Grove, and Wilmer S. Powell, Paoli, Pa., assignors to Burroughs Corporation, Detroit, Mich., a corporation of Michigan Filed May 7, 1964, Ser. No. 365,724
8 Claims. (Cl. 307—88)

ABSTRACT OF THE DISCLOSURE

The present disclosure describes both the electrical and mechanical aspects of a system for distributing excitation power to parametrons, particularly those employing magnetic thin films as variable inductance components, wherein the AC pump and DC bias currents are applied to the parametrons by means of a strip line comprising a plurality of electrical conductors arranged in sets, positioned respectively on either side of the parametron variable inductance components and coupled thereto.

The present invention relates generally to parametrically excited resonant devices, commonly known as parametrons and specifically to the class of parametrons which utilize thin magnetic films as the variable inductance component of the parametron resonant circuit. More specifically, the invention relates to an improved system of distributing the excitation power to such thin film parametrons.

The principles of parametron operation are presently well known to those skilled in the art and are described in detail in a publication authored by Eiichi Goto entitled, "The Parametron, a Digital Computing Element Which Utilizes Parametric Oscillation," and appearing in the Proceedings of the IRE, vol. 47, No. 8, August 1959. A further description of parametron devices and systems is found in U.S. Patent No. 2,948,818, issued Aug. 9, 1960 in the name of Eiichi Goto.

Briefly, the basic parametron comprises a resonant circuit including a parallel inductance and capacitance, tuned by appropriate wiring and selection of components to a desired frequency. One of the circuit components, either the inductance or the capacitance, is nonlinearly variable. When an excitation current alternating at a radio frequency (R.F.) twice that of the tuned resonant frequency of the parametron together with a DC bias current are applied to the variable component, the reactance of this component is pumped or varied with the excitation, causing the parametron to oscillate at half the frequency of the excitation current.

The parametron is thus a phase-locked subharmonic oscillator in which the relative phase angle of the oscillation, either 0° or 180°, is employed to represent binary information. The phase of the oscillation can be selected by the application of a small control or information-input signal to the resonant circuit in the early stages of its oscillation. Such an input signal produces a small initial oscillation in the parametron which serves as a "seed" or nucleus for determining the phase state of the parametron when it is in the active or excited condition.

The biphase subharmonic oscillation of parametrons allows the use of combinations of such devices to perform data storage and processing functions. In such operation, the parametrons are often connected in cascade, with the output signal of one parametron serving as the control input signal of the next parametron. Since the parametron is a two-terminal device, unilateral information flow is generally based upon a three-phase clock cycle, also referred to as three-beat excitation. Thus, each of the parametrons will be excited once in every clock cycle, at a definite time. In a system employing parametrons, the elements are arranged in three groups, I, II, III, corresponding respectively to the phases of the clock cycle. All of the parametrons in the first group I are simultaneously excited into oscillation by the alternating pump current excitation of the first clock phase; the second group II, during the second phase; the third group III, during the third phase. The excitation periods of the three clock phases are chosen to overlap one another to permit the transfer of information between parametrons of "adjacent" groups such as from group I to group II, group II to group III, group III to group I. During a given clock period, a particular parametron is either receiving information, transmitting information, or is inactive, that is, not oscillating. Information is transferred by influencing an inactive parametron with a low-amplitude signal of frequency $f$, which may be a portion of the oscillation current from one or more active donor parametrons belonging to the preceding phase group. Following receipt of this small "seed" signal, the AC pump excitation current of frequency $2f$ initiates oscillation in the receiver parametron. The phase state of this oscillation is the same as, and is determined by, the input phase from the donor parametron and the oscillation continues in this state until the excitation current is terminated. Thus one parametron element may be controlled by the oscillation of another, and information may be readily transferred from element to element. Basic logic functions such as AND and OR, together with more complex functions may be simply mechanized by parametrons operating in a majority mode. Thus, the majority phase of an odd number of inputs from donor parametrons will determine the resultant phase of the receiving parametron.

As discussed hereinbefore, the operation of a parametron system entails the cyclic excitation of groups of parametrons. The mode of distribution of the excitation power, particularly the AC pump current, is a very important consideration. The problem of delivering large amplitude currents to the pump windings of many parametrons in a system without excessive power loss and phase shift is significant for the reason that it places a limit on the size and capability of the system. The use of series connected multiturn pump coils to distribute excitation power was found to be completely unsatisfactory. The latter coils exhibited the characteristics of delay lines, attenuators and phase shifters and therefore could not be employed in the parametron system. Likewise, a parallel arrangement of such coils produced serious difficulties in the equalization of the currents flowing in each coil.

In accordance with the present invention, the problem of distributing pump power to large numbers of parametrons is solved by the use of a strip line. In general, separate strip lines are coupled respectively to the parametrons in each group. The length of the strip line is chosen to be considerably less than a quarter-wavelength at the pump frequency, so as to eliminate standing waves and insure an equal distribution of the pump current along the line.

It is therefore a general object of the present invention to provide an improved parametron system.

Another object of the present invention is to provide a parametron system in which the excitation of the parametron elements is accomplished with convenience, efficiency of excitation power and reliability.

A further object of the present invention to provide a system of pump power distribution which lends itself to system simplicity and ease of fabrication.

A more specific object of the present invention is to provide a system for the distribution of excitation power to a plurality of parametrons by means of a short-circuited strip line.

These and other features of the invention will become more fully apparent from the following description of the annexed drawings, wherein.

Figure 1:
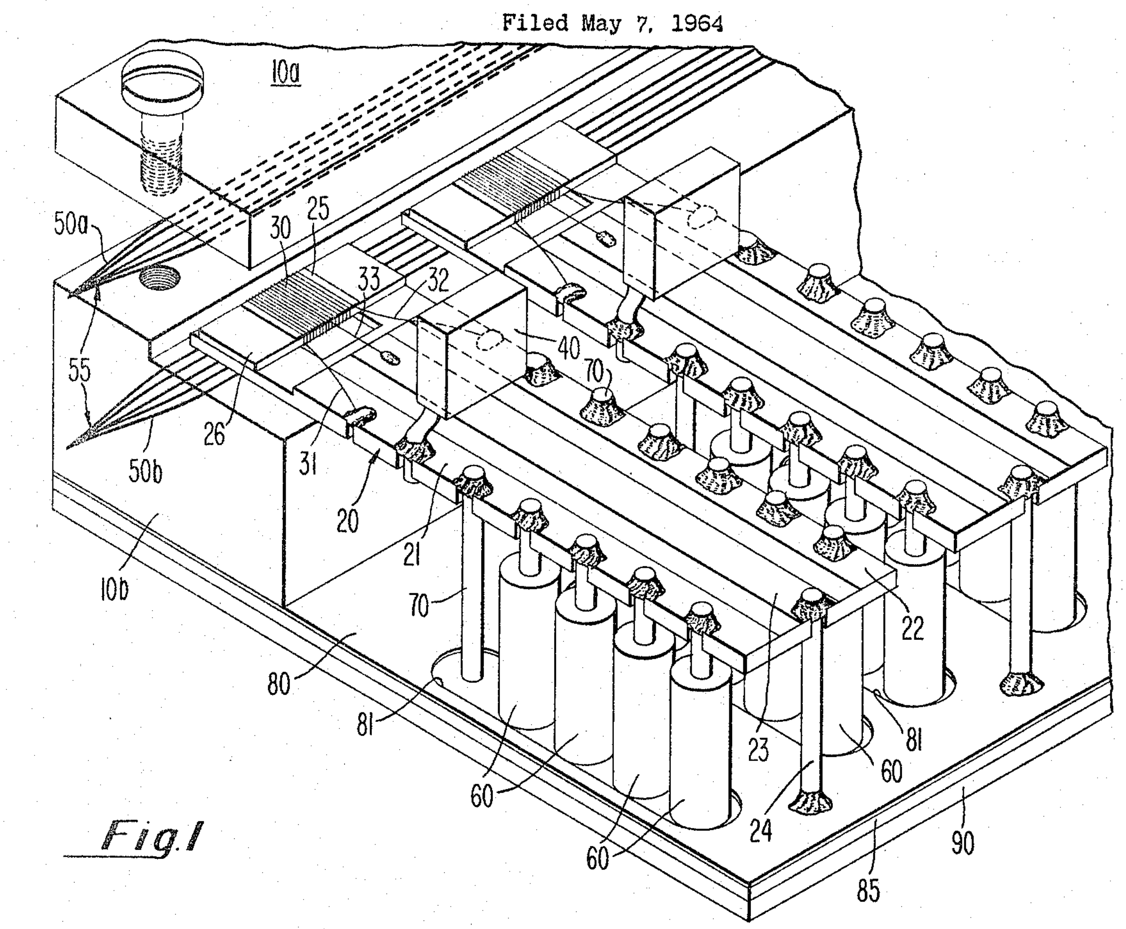
FIG. 1 is a pictorial representation of a thin-film parametron element and strip line assembly.

Referring to FIG. 1, there is illustrated a portion of an assembly of parametrons, including the strip line of the present invention. The parametrons illustrated are of the magnetic thin film variety and the specific parametron configuration depicted in FIG. 1 is described and claimed in a copending application Ser. No. 365,657 in the name of Wilmer S. Powell, entitled "Magnetic Thin Film Parametron," filed concurrently herewith and assigned to the same assignee as the present application. However, it should be apparent to those skilled in the art, that the present invention is not limited to the particular parametron configuration chosen here for purpose of example.

The major supporting portions of the assembly are two sections of Plexiglas or other suitable material, 10*a* and 10*b* which are assembled as a unit. The components of each of the two parametrons illustrated are mounted on small printed connector boards 20. The ferromagnetic film element is depicted as being rectangular in form and is identified by reference numeral 25. The film is deposited on a glass substrate 26. A center-tapped winding 30, or tank coil, is wound in inductive coupling relation to the film 25. The axis of the tank coil is oriented perpendicular to the preferred axis of magnetization of the film element. Current flow through the tank coil causes a magnetizing field transverse to said preferred axis to be applied to the element. The tank coil and thin film element together comprise the variable inductance component of the parametron resonant circuit. A capacitor 40 mounted on the component board 20 completes the latter circuit.

The parametron component board has a slotted thin-step portion at one extremity thereof which accommodates the glass substrate 26 bearing the film and tank coil assembly, which is then glued or otherwise suitably fastened to the component board 20. The assembly is then positioned between the double set of conductors 50*a* and 50*b* which make up the strip line 55, in such a way that the variable inductor is centered orthogonally within the strip. Current flowing through the pump strip 55 causes a magnetizing field to be applied to the variable inductance in a direction parallel to the preferred axis of the film.

The set of conductors 50*a* of the strip line 55 in FIG. 1 is depicted as passing from left to right over the top of the variable inductors of all of the parametrons which it drives and set 50*b* as returning from right to left beneath the inductors. The line 55 is made up of a plurality of conductors, for example, the five wires shown in each set in FIG. 1, which have been inserted into slots milled respectively into the support pieces 10*a* and 10*b*. As an alternate method of fabrication (not shown) slots would not be required and the wires would be replaced by glass-epoxy printed circuit boards bonded to the support pieces. In either case, the use of separate parallel conductors in place of a single wide solid conductor has the added advantage of producing a laminated strip which inhibits eddy-current loading of the parametrons.

Considering further the component board layout in FIG. 1, the two outer conductors 21 and 22 are slotted to receive the tank coil leads 31 and 32, the input resistors 60 connected selectively to either side of the tank coil for coupling oscillation signals from donor parametrons into the resonant circuit of the receiving parametron, and the output conductors 70 for transferring the output oscillation of the donor parametron to one or more receiving parametrons in accordance with a logical program. The center tap 33 of the tank coil is soldered to the center conductor 23 on the board. The electrical connection between the center conductor 23 and the copper ground plane 80 is provided by a short length of bus wire 24, which also provides mechanical support for the component board. The ground plane 80 is an important factor in the layout and is required to provide a low impedance path for signal currents which flow through the grounded center taps of the tank coils. The ground plane 80 also tends to reduce the voltage at the pump frequency appearing at the parametron terminals.

One lead of each input resistor 60 is soldered to the appropriate outer conductor, either 21 or 22, of the component board 20. The other lead of each resistor is inserted through the cutout 81 in the ground plane 80 and into a printed circuit board 90 which provides all the logic interconnections among the parametrons. Output wires 70 are connected between the parametron component board 20 and the printed circuit logic board 90 in the same manner. The ground plane 80 and the printed circuit board 90 are separated from each other by a layer of insulating material, 85.

Figure 2:
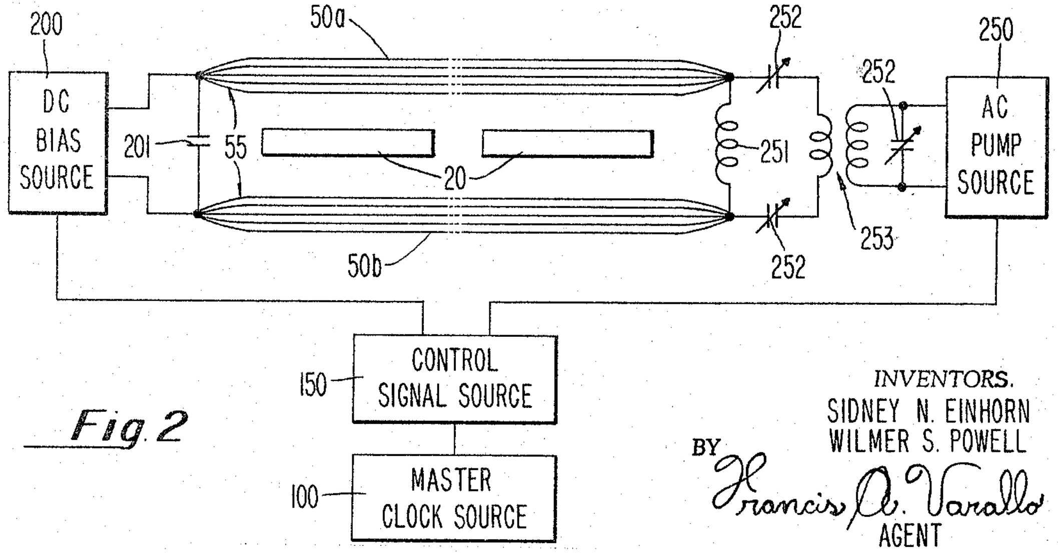
FIG. 2 is a simplified electrical schematic illustrating the strip line and the manner of applying excitation power thereto.

FIG. 2 illustrates the double set of strip conductors 50*a* and 50*b* which comprise the strip line 55 of the present invention and which are also depicted in FIG. 1. The physical placement of the strip line is shown relative to the parametron component boards 20. In a practical system, the parametrons are arranged in groups as discussed hereinbefore. Therefore, a separate line would be employed to activate the parametrons of each group in a cyclical manner, by energizing the strip line to which they are coupled.

The timing for the excitation of the parametron elements is derived from Master Clock Source 100. Control Signal Source 150, in synchronism with the clock pulses provides input pulses at the proper times and for suitable durations to the DC Bias Source 200 and the AC Pump Source 250.

Capacitor 201 acts as a short circuit for the alternating pump current from the source 250, while inductor 251 blocks the pump current and provides a return path for the DC bias current from source 200.

The tuning capacitors 252 and the transformer 253 provide a means of tuning or matching the impedance of the strip line to the impedance of the AC Pump Source 250 so as to provide the most efficient transfer of the AC power to the strip line 55.

It is obvious from the foregoing description of the invention and its mode of operation that the use of a strip line to distribute excitation power to parametron elements is a significantly convenient and efficient technique both from the electrical standpoint and the mechanical packaging aspect. It should be understood that modifications of the arrangements described herein may be required to fit particular operating requirements. These will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. In a parametric system comprising a plurality of parametrons, each having a resonant circuit containing a variable inductance, said variable inductance including a planar magnetic element and a tank winding coupled to said magnetic element, the improvement comprising a strip line for distributing to selected parametrons of said system excitation power including AC pump current of twice the resonant frequency of said resonant circuit and a DC bias current, said strip line comprising a plurality of individual conductors arranged in two sets having equal numbers of conductors, said sets of conductors being disposed respectively on either side of said variable inductance and being coupled thereto, said sets of conductors being coupled to each other at one extremity thereof by a capacitor and a source of DC bias current and at the other extremity thereof by an inductor and a source of AC pump current.

2. In a parametric system comprising a plurality of parametrons arranged in groups to perform a logical function, each of said parametrons having a resonant circuit containing a variable inductance, the improvement comprising a strip line for each of said groups of parametrons, each said strip line being operable to apply to the parametrons coupled thereto excitation power including AC pump current of twice the resonant frequency of said resonant circuit and a DC bias current, each said strip line comprising a plurality of conductors arranged in sets and positioned respectively on either side of the variable inductances of all of the parametrons in a group, said sets of conductors being coupled to each other at one extremity thereof by a capacitor having a pair of terminals connected respectively to said sets, means for coupling a source of DC bias current to said pair of capacitor terminals, said sets of conductors being coupled to each other at the other extremity thereof by an inductor having a pair of terminals connected respectively to said sets and means for coupling a source of AC pump current to said pair of inductor terminals.

3. The improvement as defined in claim 2 further characterized in that said means for coupling a source of AC pump current to said inductor comprises a coupling transformer and a plurality of capacitors tuned to match the impedance of said source of pump current to said strip line so as to achieve maximum efficiency in the transfer of pump power to said strip line.

4. The improvement as defined in claim 2 including a source of control signals coupled to both said sources of DC bias current and AC pump current for directing said sources to apply bias and pump currents respectively to said strip line.

5. The improvement as defined in claim 4 further including a master clock source for applying synchronizing signals to said control signal source, for determining the time of occurrence and duration of the excitation power carried by said strip line.

6. In a parametric system for performing logic functions, a plurality of parametron assemblies, each assembly comprising a component printed conductor board having outer conductive strips and a central conductive strip, a substrate bearing a thin magnetic film, a center-tapped tank coil wound about said magnetic film and substrate in close proximity thereto and in inductive coupling relation to said magnetic film, said substrate being attached to one extremity of said component board, a strip line comprising a double set of conductors, supporting means for mounting said double set of conductors, said substrate bearing said thin film and said tank coil being positioned between said double set of conductors whereby a set of conductors appears on either side thereof, the extremities of said tank coil being connected respectively to said outer conductive strips of said component board and said center tap being connected to said central conductive strip of said component board, a capacitor having a pair of terminals connected respectively to said outer conductive strips of said component board, a ground plane, conductor means coupling said central conductive strip of said component board to said ground plane, a logic printed circuit board having a plurality of terminals, a plurality of resistance elements having first leads connected selectively to said outer conductive strips of said component board and second leads connected selectively to said terminals of said logic board, and a plurality of output conductors connected selectively between said outer conductive strips of said component board and said terminals of said logic board.

7. A parametron assembly as defined in claim 6 further characterized in that said supporting means for mounting said double set of conductors comprises a pair of sections of nonconductive, nonmagnetic material, each section being provided with a plurality of slots for accommodating the respective conductors of a set whereby said latter conductors are maintained in a predetermined spaced apart relation to one another.

8. A parametron assembly as defined in claim 6 wherein said ground plane and said logic board are positioned in closely spaced parallel planes and are separated from each other by a layer of electrically insulating material.

References Cited

UNITED STATES PATENTS

| | | | |
|---|---|---|---|
| 3,002,108 | 9/1961 | Sterzer | 307—88 |
| 3,051,844 | 8/1962 | Beam et al. | 307—88 |
| 3,143,657 | 8/1964 | Landauer | 307—88 |
| 3,239,680 | 3/1966 | Ehresman | 307—88 |

OTHER REFERENCES

IBM Technical Disclosure Bulletin, "Parametric Amplifier," by Landauer, vol. 3, No. 7, December 1960, page 35.

IBM Technical Disclosure Bulletin, "Transmission Line Parametric Amplifier," by Holzman, vol. 3, No. 7, December 1960, page 33.

BERNARD KONICK, *Primary Examiner.*

STANLEY URYNOWICZ, *Examiner.*